(12) United States Patent
Bill et al.

(10) Patent No.: US 12,109,850 B2
(45) Date of Patent: *Oct. 8, 2024

(54) TYRE MONITORING DEVICE AND METHOD

(71) Applicants: Airbus Operations Limited, Bristol (GB); Airbus Operations GmbH, Hamburg (DE)

(72) Inventors: Andrew Bill, Bristol (GB); Timo Warns, Hamburg (DE)

(73) Assignees: Airbus Operations Limited, Bristol (GB); Airbus Operations GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,969

(22) Filed: Apr. 21, 2023

(65) Prior Publication Data

US 2023/0249499 A1 Aug. 10, 2023

Related U.S. Application Data

(63) Continuation of application No. 17/067,576, filed on Oct. 9, 2020, now Pat. No. 11,654,729, which is a
(Continued)

(30) Foreign Application Priority Data

Dec. 18, 2017 (GB) ...................... 1721142

(51) Int. Cl.
*B60C 23/04* (2006.01)
*B60C 23/20* (2006.01)
*G01K 1/14* (2021.01)

(52) U.S. Cl.
CPC ...... *B60C 23/0408* (2013.01); *B60C 23/0422* (2013.01); *B60C 23/0442* (2013.01);
(Continued)

(58) Field of Classification Search
CPC ............ B60C 23/0408; B60C 23/0422; B60C 23/0442; B60C 23/20; B60C 2200/02;
(Continued)

(56) References Cited

U.S. PATENT DOCUMENTS 4,308,520 A 12/1981 Darlington
8,599,044 B2 12/2013 Maggiore et al.
(Continued)

FOREIGN PATENT DOCUMENTS

EP 1172237 1/2002
EP 1 227 018 7/2002
(Continued)

OTHER PUBLICATIONS

JohnDow Dynamic TPMS Solutions, "FAQ", dynamictpms.com (online); https://www.dynamictpms.com/faq, (Jun. 13, 2017), 2 pages.
(Continued)

*Primary Examiner* — Daryl C Pope
(74) *Attorney, Agent, or Firm* — Nixon & Vanderhye P.C.

(57) ABSTRACT

A tire monitoring device configured to be mounted on a wheel and including: a pressure sensor for sensing an inflation pressure of a tire on the wheel; a wireless communication interface configured to receive data indicative of a command to indicate tire pressure, wherein the wireless communication interface is configured to communicate with at least one other tire monitoring device; a storage storing a predetermined pressure value; an indicator configured to provide a first indication and a second indication, wherein the first indication is different from the second indication; and a processing system configured to operate the indicator to provide the first indication or the second indication responsive to receipt of the command to indicate tire pres-
(Continued)

sure, and based at least in part on the inflation pressure and the predetermined pressure value.

17 Claims, 8 Drawing Sheets

Related U.S. Application Data continuation of application No. 16/221,854, filed on Dec. 17, 2018, now Pat. No. 10,828,943.

(52) U.S. Cl.
CPC ............... B60C 23/20 (2013.01); G01K 1/14 (2013.01); *B60C 2200/02* (2013.01)

(58) Field of Classification Search
CPC ............ B60C 23/0447; B60C 23/0455; B60C 23/0454; B60C 23/0461; B60C 23/0471; B60C 23/0479; G01K 1/14
See application file for complete search history.

(56) References Cited

U.S. PATENT DOCUMENTS

| | | | |
|---|---|---|---|
| 10,183,534 B2 | 1/2019 | Bill | |
| 10,828,943 B2* | 11/2020 | Bill | ............ B60C 23/0422 |
| 2001/0008083 A1 | 7/2001 | Brown | |
| 2003/0006895 A1 | 1/2003 | Drake et al. | |
| 2005/0007245 A1 | 1/2005 | Smith | |
| 2005/0179531 A1 | 8/2005 | Tabe | |
| 2007/0193349 A1* | 8/2007 | Petrucelli | ............ B60C 23/0408 |
| | | | 73/146.8 |
| 2007/0208841 A1 | 9/2007 | Barone | |
| 2010/0117816 A1 | 5/2010 | Okada | |
| 2012/0152008 A1 | 6/2012 | Yu | |
| 2012/0161955 A1 | 6/2012 | Togawa | |
| 2014/0368327 A1* | 12/2014 | Darrer | ................ G06K 19/0708 |
| | | | 340/447 |
| 2015/0231936 A1* | 8/2015 | Keller | ...................... G08B 7/06 |
| | | | 340/442 |
| 2016/0009290 A1 | 1/2016 | Benedict et al. | |
| 2017/0015151 A1 | 1/2017 | Bill | |
| 2017/0190225 A1 | 7/2017 | Yu | |
| 2018/0050571 A1 | 2/2018 | Usami | |
| 2019/0118589 A1 | 4/2019 | Patel et al. | |

FOREIGN PATENT DOCUMENTS

| | | |
|---|---|---|
| EP | 2722201 | 4/2014 |
| EP | 2 910 393 | 8/2015 |
| EP | 3069903 | 9/2016 |
| EP | 3 150 408 | 4/2017 |
| EP | 3249880 | 11/2017 |
| GB | 2550174 | 11/2017 |
| WO | 2016/198970 | 12/2016 |
| WO | 2016196505 | 12/2016 |
| WO | 2017/162451 | 9/2017 |

OTHER PUBLICATIONS

Mike Mavrigian, "Dealing with TPMS Problems: Tips to Avoid Issues and Diagnose Glitches" autoserviceprofessional.com (Online); https://www.autoserviceprofessional.com/article/97996/dealing-with-tpms-problems-tips-to-avoid-issues-and-diagnose-glitches , (Jun. 13, 2017), 8 pages.

* cited by examiner

TYRE MONITORING DEVICE AND METHOD

RELATED APPLICATIONS

This application is a continuation of U.S. patent application Ser. No. 17/067,576, filed Oct. 9, 2020 which is a continuation of U.S. patent application Ser. No. 16/221,854, filed Dec. 17, 2018, which claims priority to United Kingdom Patent Application GB 1721142.6, filed Dec. 18, 2017, and the entire contents of these applications are incorporated by reference.

TECHNICAL FIELD

The present disclosure relates to monitoring devices, such as tyre monitoring devices and methods of their use and configuration. In examples, the present disclosure relates to aircraft tyre monitoring devices.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading, but can still take time due to a requirement to travel from wheel to wheel measuring the pressures.

Ensuring that the tyre pressures indicated by any automated measurement are accurate and/or reliable is also important. This is not just that the measurement is accurate, but also that the display itself shows an accurate representation of the pressure. This becomes more important when using wireless interfaces because of the increased possibility for the display to be corrupted, perhaps from malfunction or malicious software on a display device.

It would be desirable to provide a tyre pressure measurement system which addresses some, or all, of these points.

SUMMARY

According to a first aspect of the present invention, there is provided a tyre monitoring device configured to be mounted on a wheel. The device comprises: a pressure sensor for sensing an inflation pressure of a tyre on the wheel; a wireless communication interface configured to receive data indicative of a command to indicate tyre pressure; a storage storing a predetermined pressure value; an indicator configured to provide a first indication and a second indication, wherein the first indication is different from the second indication; and a processing system. The processing system is configured to operate the indicator to provide the first indication or the second indication responsive to receipt of the command to indicate tyre pressure, and based at least in part on the inflation pressure and the predetermined pressure value.

Optionally, the wireless communication interface is configured to communicate with at least one other tyre monitoring device.

Optionally, the processing system is configured to operate the indicator to provide the first indication or the second indication further based at least in part on data indicative of inflation pressure from the at least one other tyre monitoring device over the wireless communication interface.

Optionally, the wireless communication interface is configured to communicate with the at least one other tyre monitoring device over a first network; and configured to communicate with a control device over a second network; wherein the first network and second network are separate.

Optionally, the wireless communication system comprises a first transceiver and a second transceiver, the first transceiver having a longer transmission range that the second transceiver.

Optionally, the second transceiver is configured for communication with a configuration device.

Optionally, the indicator comprises a visual indicator.

Optionally, the indicator comprises an audible indicator.

Optionally, the tyre monitoring device comprises a temperature sensor for sensing a temperature of the wheel or a temperature of gas inside the tyre.

The tyre monitoring device as described above, with or without the optional features also described, may be configured for use on an aircraft tyre.

In a second aspect, a tyre pressure measurement system may comprise a plurality of tyre monitoring devices as described above, with or without the optional features also described, wherein the plurality of tyre monitoring devices are in communication with each other.

Optionally, the tyre pressure measurement system also comprises a control device. The control device comprises a wireless communication interface configured to send data indicative of a command at least one of the plurality of tyre monitoring devices.

Optionally, the tyre pressure measurement system also comprises a configuration device comprising a wireless communication interface configured to transmit data indicative of a configuration command to at least one of the plurality of tyre monitoring devices.

Optionally, the wireless communication interface of the configuration device has a transmit range of less than 1 m.

According to a third aspect, there is provided a method of checking tyre pressures using a monitoring device comprising an indicator, a pressure sensor and a wireless communication interface. The method comprises, at the monitoring device: receiving, via the wireless communication interface, data indicative of a request to check tyre pressures from a control device; and responsive to the request to check tyre pressures: determining a first inflation status of a tyre associated with the monitoring device using the pressure sensor; and using the indicator to provide an indication based at least in part on the first inflation status.

Optionally, the method comprises, responsive to the request to check tyre pressures: determining a second inflation status of at least one other tyre; and wherein the using the indicator to provide an indication is further based at least in part on the second inflation status.

Optionally, the using the indicator to provide an indication comprises: using the indicator to provide a first indication when at least one of (i) the first inflation status is that a first pressure measured by a pressure sensor is below a first predetermined threshold and (ii) the second inflation status is indicative that a second pressure is below a second predetermined threshold; and using the indicator to provide a second indication otherwise, wherein the second indication is different from the first indication.

Optionally, the method further comprises transmitting, using the wireless communication interface, data of the inflation pressure to the control device.

According to a fourth aspect, there is provided a method of configuring a monitoring device, the monitoring device comprising a storage and a wireless communication interface. The method comprises, at the monitoring device: receiving data indicative of a first configuration message from a first device via the wireless communication interface; determining that the pressure measured by the pressure sensor is approximately zero; entering a configuration mode responsive to the configuration message and the determination that the pressure is zero.

Optionally, the method further comprises receiving data indicative of a second configuration message from a second device via the wireless communication interface while in the configuration mode; and setting a configuration parameter in the storage based on the second configuration message.

Optionally, the data indicative of a first configuration message is received using a first wireless communication mode and the data indicative of a second configuration message is received using a second wireless communication mode.

According to a fifth aspect, there is provided a monitoring device comprising: storage; a pressure sensor; a wireless communication interface; and a processor configured to carry out the method of the above described fourth aspect, with or without the optional features also described.

Further features and advantages of the invention will become apparent from the following description of preferred examples of the invention, given by way of example only, which is made with reference to the accompanying drawings.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, a wireless tyre monitoring system is provided in which an indication of status is provided both on a control device and on an indicator of the sensors themselves. This provides additional assurance of the result provided on the control device and may allow the use of control devices, such as a mobile or tablet, without requiring additional hardware to give assurance that the displayed data on the control device is correct. In some examples, the indication of a fault results in all the tyre monitoring devices indicating a fault, even for tyre monitoring devices where a fault is not present, making identification of faults simpler.

According to examples herein, a wireless tyre monitoring system comprises three elements: wireless tyre monitoring devices, a control device and a configuration device. This allows a system which is secure and easy to use. For example, the configuration device may be required to enter some or all configuration commands to a wireless tyre monitoring device, providing security by requiring a particular device to be used for configuration. Meanwhile, ease of use may be improved by providing the control device, which may be a mobile device running an app, for execution of other functions, such as using the system to check tyre pressures.

Examples are also described which provide methods of configuring a tyre monitoring device to increase security, for example by requiring additional authentication factors, and physical requirements for a tyre monitoring device to be in a configuration mode.

Figure 1:
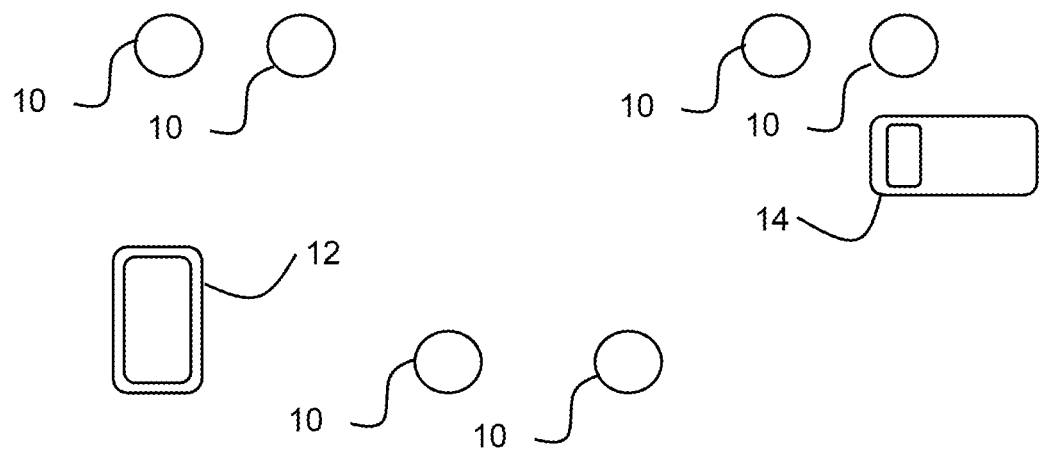
FIG. 1 shows a schematic representation of a tyre pressure sensor system according to a first example of the invention.

FIG. 1 shows a schematic representation of a tyre pressure sensor system according to a first example of the invention. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
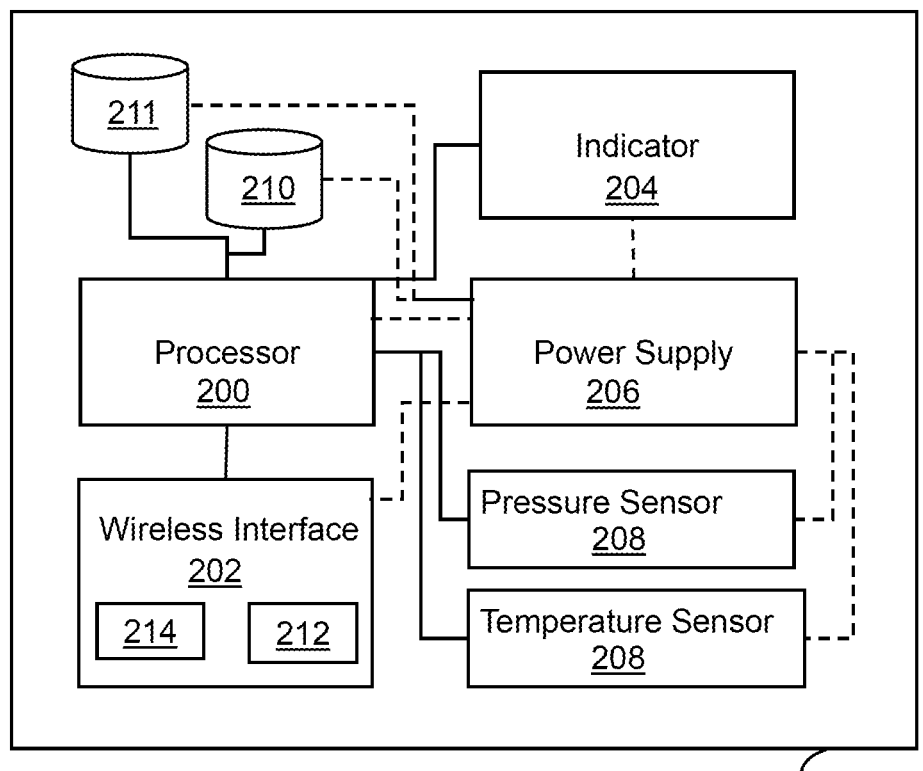
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, at temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a standard according to IEEE 802.11 (WiFi) to communicate on the 2.4 GHz or 5 GHz Industrial Scientific and Medical (ISM) bands, or may use a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as Bluetooth® IEEE 802.15.4, or Near Field Communication (NFC). The second transceiver may operate over a range of less than 5 m, less than 3 m, less, than 1 m, less than 50 cm, less than 25 cm, or potentially requiring contact or less than 1 cm between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once per day, this can provide useful power savings. In other examples, pressure may be sensed more frequently, for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
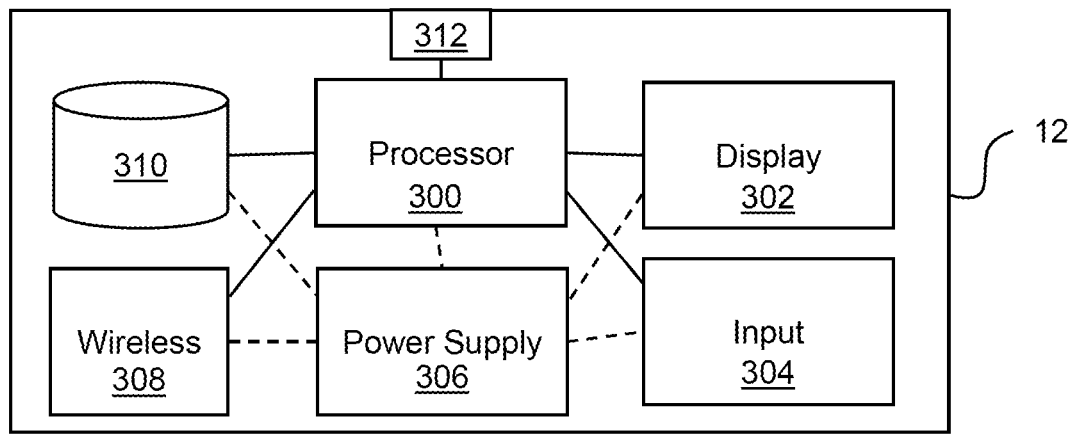
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to the IEEE 802.11 family of standards. This allows the control device 12 to interact with the tyre monitoring devices from a relatively long range.

In other examples, the control device may be provided with multiple transceivers, operating with different wireless technologies, such as IEEE 802.11 and IEEE 802.15.4.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system.

Figure 4:
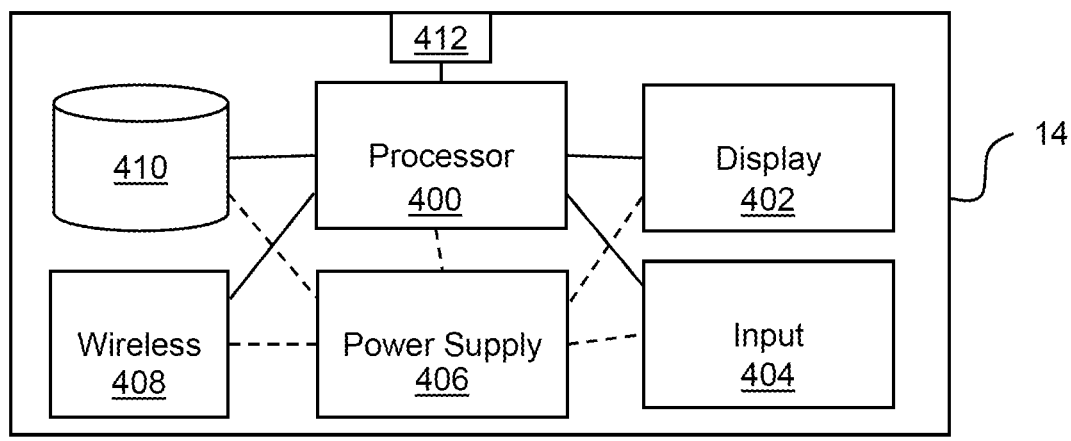
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless 408, storage 410 and wired communication interface 412 and these are generally the same as described above for the control device, unless described otherwise below. In this example the configuration device is a mobile device, but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.4, Bluetooth®, NFC or RFID. As will be explained in more detail below, this allows the configuration device to act as an additional authentication factor when configuring the tyre monitoring devices.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as IEEE 802.15.4, Bluetooth® or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands.

Figure 5:
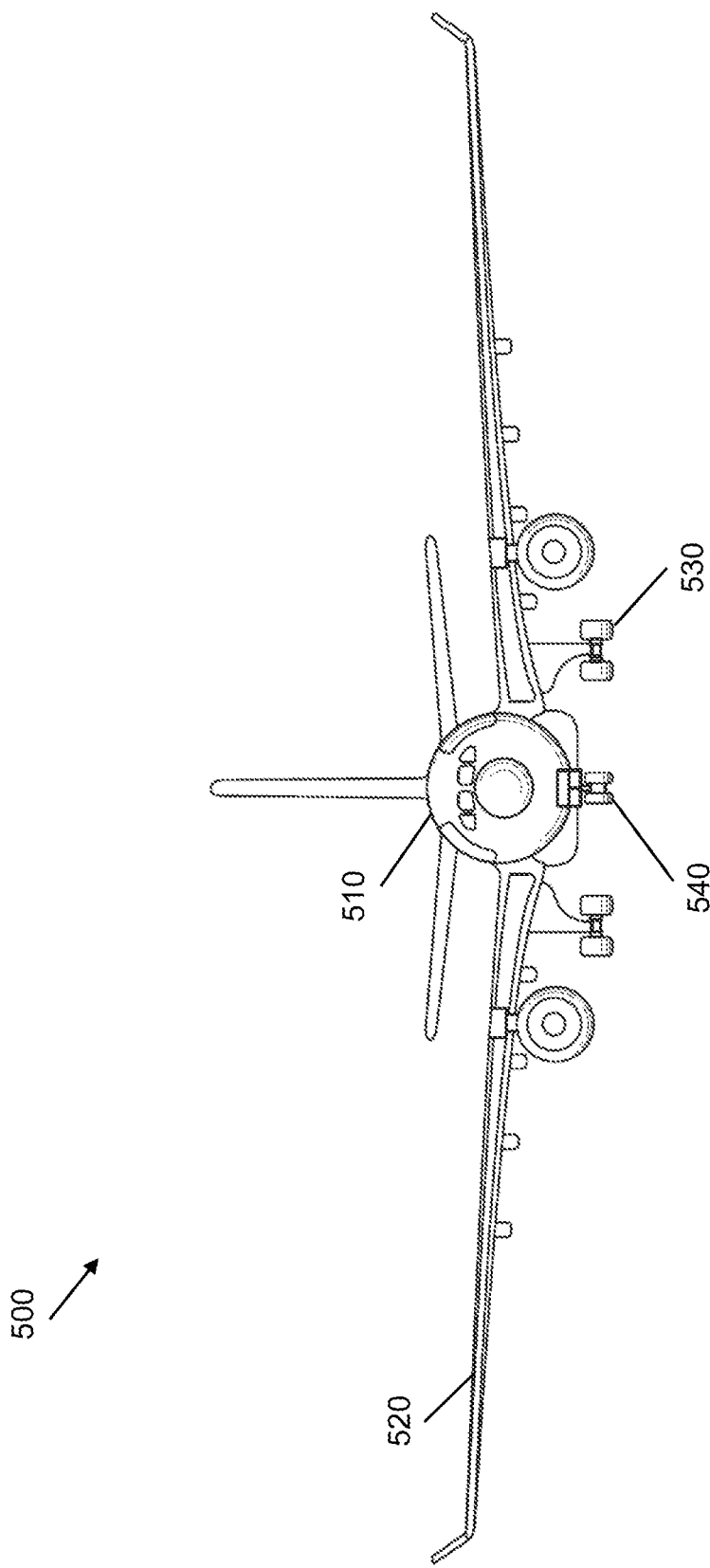
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices are also in communication with a cockpit system to provide tyre pressure information to the pilots on the flight deck. In these examples, the flight deck console may also function as a control device.

Figure 6:
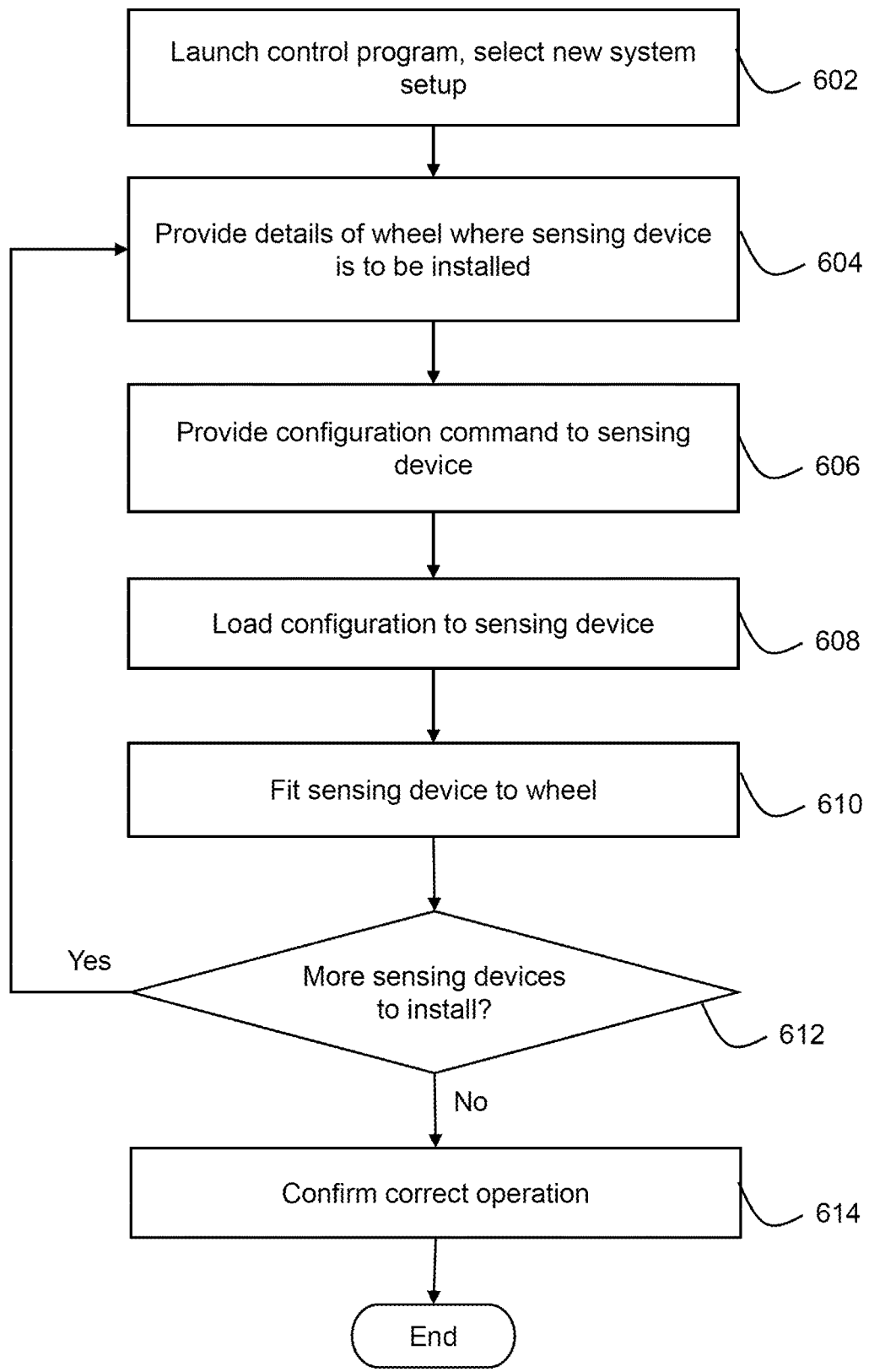
FIG. 6 shows a flow chart of the initial set up process for a tyre monitoring device that can be used with the example of FIG. 1.

FIG. 6 shows a flow chart of the initial set up process for a tyre monitoring device that can be used with the example of FIG. 1. This process of FIG. 6 is used when no tyre pressure sensor devices are fitted to a vehicle, such as the aircraft of FIG. 5. The process of FIG. 6 can be used for retro-fitting or as part of the manufacturing process. Before beginning the process, a set of tyre monitoring devices is provided. For example, there may one for each wheel where pressure is desired to be monitored, or there may be more than one (for example to provide redundancy in the pressure measurement of the tyres on one or more wheels).

First, at block 602, the control device 12 is used to launch a tyre pressure sensor system control application. The application presents a user interface on the display including an option "system setup". The "system setup" option is selected by a user, for example through interaction with the touch screen input of the control device 12.

Next, at block 604, the application on the control device 12 prompts the user to enter configuration information for the first wheel where a tyre monitoring device is to be installed. This may include one or more of "Wheel position", "Vehicle Identification" and "Reference Pressure". For example, an aircraft may have wheel positions of "Nose Right", "Nose Left" for the nose landing gear and "1", "2", "3", "4" for the main landing gear. The reference pressure may be specific to a particular wheel or wheels of the vehicle, for example the main landing gear wheels may have a different reference pressure than the nose landing gear wheels. The "Vehicle identification" may be an aircraft tail identification. Once the information is entered, the user selects an option, such as "upload" to store the information in the application. The control device then broadcasts periodically that it has configuration parameters available for upload and waits to receive communication from a tyre sensing device to be installed in the wheel. In some examples a display or other prompt may be provided by the controller device to prepare a tyre sensing to be configured with the entered parameters. For example, a visual or audible prompt may instruct the user to "touch the tyre sensing device with the configuration device".

Block 604 may also include the transmission of data to other devices, for example a server system in a local area network or on another network such as a secure server on the internet. In some examples, the vehicle identification and reference pressures in block 604 may be populated automatically by taking a photo of the vehicle identification with the control device, using optical character recognition to determine the identification and then looking the reference pressures up in a database, which may on a server or stored locally in the storage of the control device itself. In other examples a bar code, or other form of encoded identification may be read by the control device.

Next, at block 606, the user provides a configuration command to a tyre sensing device to be installed in the wheel. In some examples, this is provided by touching the tyre sensing device with the configuration device 14, which provides a configuration command using short range communication, such as NFC. The tyre sensing device then enters a configuration mode and listens for a control device broadcasting configuration parameters. The configuration command may include network keys to allow the tyre sensing device to join the tyre sensor network in order to listen for the control device broadcast.

At block 608, the tyre monitoring device contacts the control device, a secure communication session is established, such as by exchanging session keys for encryption, and the configuration parameters transferred from the control device in a configuration command. The tyre sensing device stores the configuration parameters in its storage and exits the configuration mode. The processor of the tyre sensing device instructs the indicator to provide a "fault" indication, such as a solid red light for a predetermined time period, because the tyre sensing device measures a zero pressure. In some examples the communication with the control device uses a different communication mode or technology than the communication with the configuration device, for example using a longer range technology such as IEEE 802.11.

At block 610, the tyre monitoring device is fitted to the wheel. Providing that the measured pressure by the pressure sensor is above a predetermined threshold of the reference pressure loaded at block 608, the processor instructs the indicator to provide an "OK" indication, such as a solid green light for a predetermined time period. In this example the predetermined threshold is about 89% of the reference pressure. In other examples, the predetermined threshold may be about 95% of the reference pressure, about 90% of the reference pressure or about 85% of the reference pressure.

At block 612, it is determined whether there are further tyre monitoring devices to install. If there are, execution returns to block 604 and the configuration process is repeated for a different wheel. If there are no more tyre monitoring devices to install, execution continues to block 614.

The correct operation of the sensor system is confirmed at block 614. This may comprise internal checks with data provided to the control device during the configuration process. For example, checking that wheel reference pressures are consistent, checking consistent reference pressure between the nose landing gear wheels, checking consistent reference pressure between the main landing gear wheels, and checking consistent vehicle identification between all the wheels. Confirming correct operation may also comprise checking that the pressures measured by the pressure sensors match manual measurements of each wheel, for example by prompting a user to take a manual measurement of each wheel and enter into the control device. Confirming correct operation may also comprise obtaining and displaying data with the configuration device and checking that it matches the data required. This may guard against compromise of the control device, for example if data had become corrupted so that the displayed values did not match the actual values. Confirming correct operation may be automated in whole or in part, for example all checks which do not require manual checking may be automated in some examples.

Although the process of FIG. 6 has been described as using a control device and a configuration device, in some examples a single device can act as both a control device and a configuration device. For example, a device may have both a long range transceiver and a short range transceiver (in the same way as the tyre sensing devices) and be configured to use each as appropriate.

Figure 7:
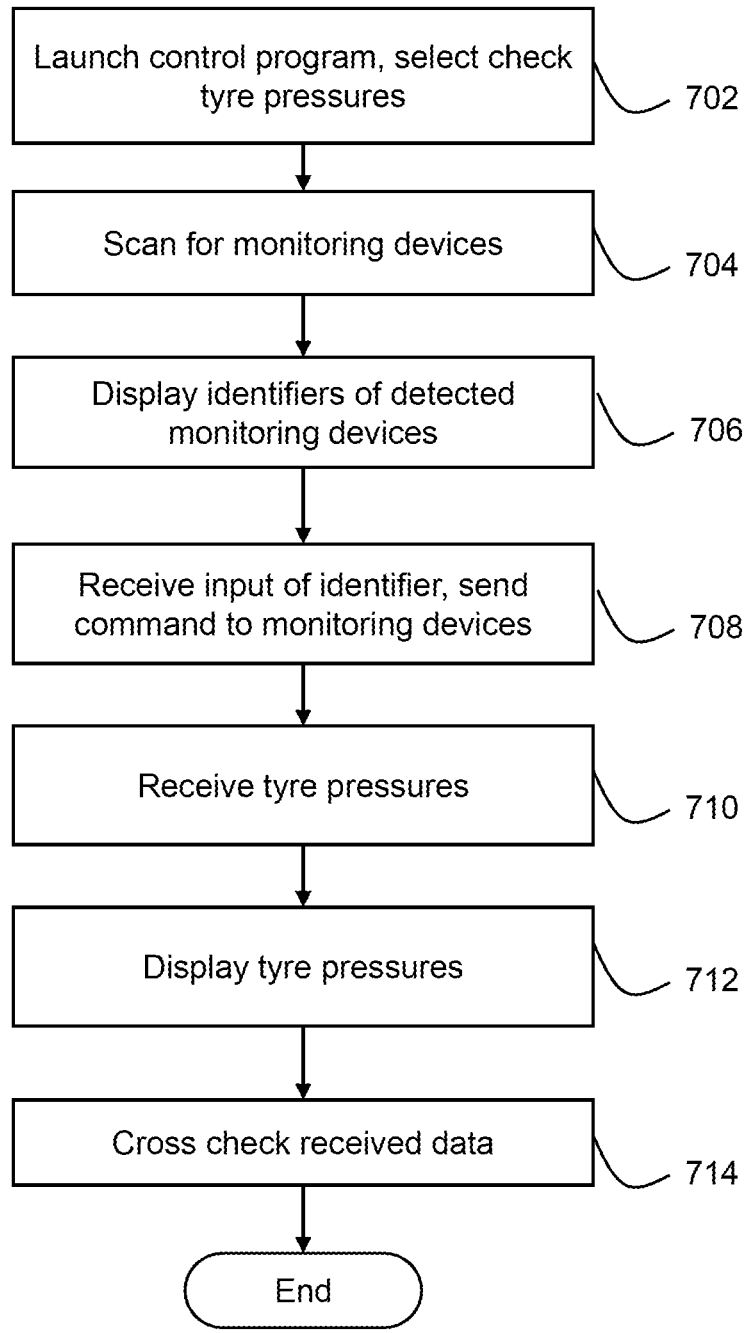
FIG. 7 shows a flow chart of a tyre pressure check process that can be used with the example of FIG. 1.

FIG. 7 shows a flow chart of a tyre pressure check process that can be used with the example of FIG. 1 once the sensor system has been set up. First, at block 702, a user launches the tyre monitoring control application on the control device 12. Next, at block 704, the control device scans for tyre monitoring devices in range. This may comprise establishing direct, point-to-point contact, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

At block 706, the control device displays the identifiers of detected vehicles. Depending on the communication range and location, more than one vehicle may be detected. For example, several aircraft may be in the same hanger in range of the control device.

At block 708, the user selects the desired identifier. A command is then sent to the tyre monitoring devices corresponding to the identifier to cause them to read the pressures and report back to the control device. Responses are received at block 710 and displayed on the control device at block 712. The display of pressures may include one or both of a numerical value and a status indication such as "OK" or "Low Pressure".

At block 714 a cross check of the received data may be made to ensure data consistency. The process then ends.

Throughout the process of FIG. 7, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (WiFi) standards may allow transmission over a distance of 50 m or further in clear space. This alone may be sufficient to provide increased security because physical proximity is required to intercept communications. In some examples security may be increased by reducing transmission power when encryption keys are transmitted compared to transmission of the encrypted data itself, requiring closer proximity for the initial key exchange process.

Figure 8:
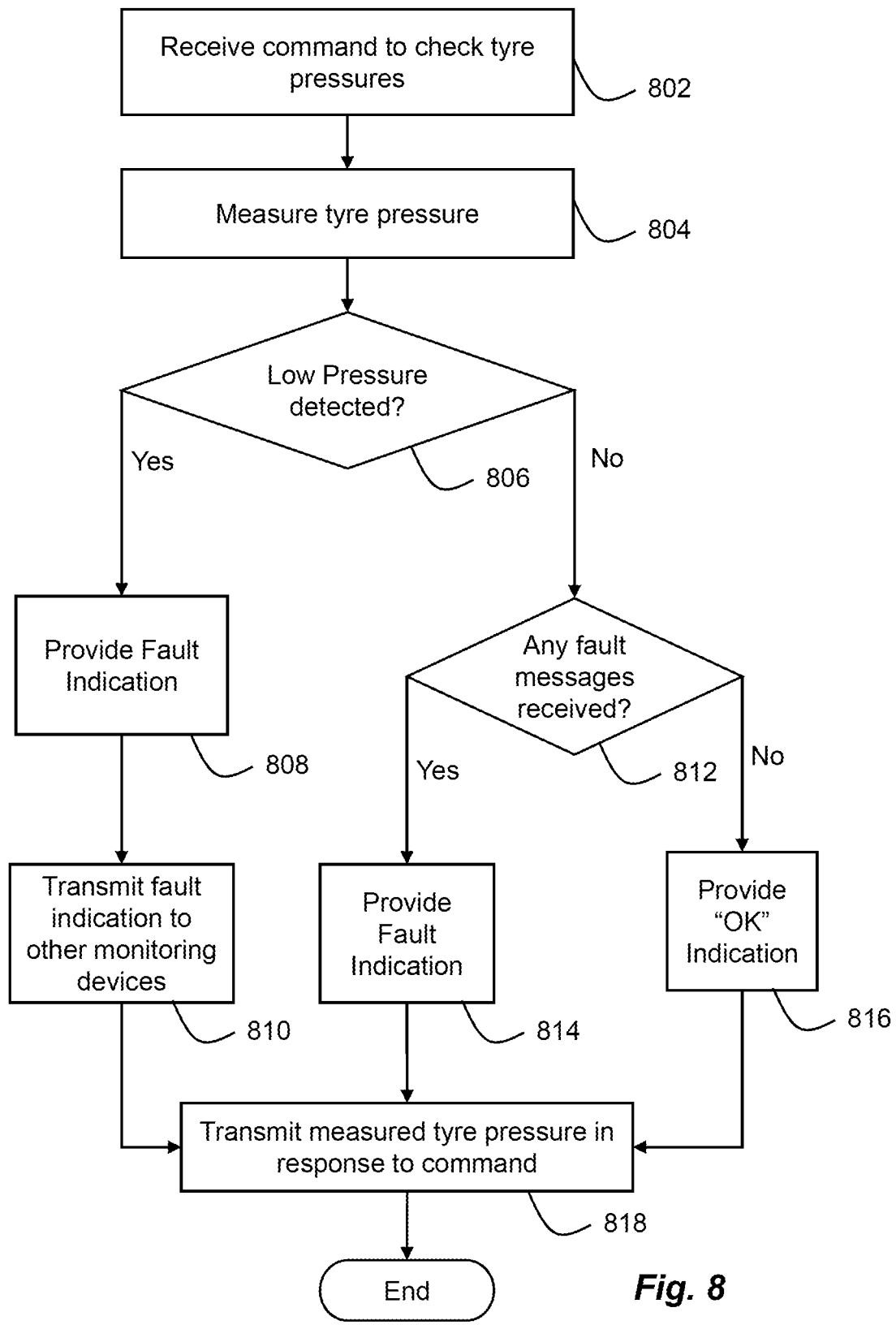
FIG. 8 shows a flow chart of tyre pressure check process that can be used by the tyre monitoring device of FIG. 2.

FIG. 8 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device.

First, at block 802, a tyre monitoring device receives a command to check pressures over the wireless communication interface. In response, at block 804, the processor uses the pressure sensor to measure the pressure in the tyre. The measured pressure is then compared against the reference pressure in block 806 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. If low pressure is detected, execution proceeds to block 808, otherwise execution proceeds to block 812.

At block 808, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 810, again using the wireless communication interface.

At block 812, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the transmission of a fault indication at block 808. In other examples, the fault message may be received responsive a status enquiry sent by the tyre monitoring device to the other tyre monitoring devices. If any fault messages are received, execution proceeds to block 814, where the processor uses the indicator to display a fault condition. For example, the fault indication may be the same as that used in block 808. In other examples, the fault indication may be different than that used in block 808, for example a second fault indication such as a flashing red light for a predetermined period. By using the second fault indication, the tyre monitoring device can indicate a fault in another tyre, yet signal that its own measured pressure is not low.

If no fault messages are received at block 812, execution proceeds to block 816 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low.

Finally at block 818, the data of the measured tyre pressure is transmitted in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 818 may be sent directly to a control device 12, to another tyre monitoring device 10 for onward routing, or to an access point or other wireless node.

With the method of FIG. 8, confirmation of tyre pressure status is provided by the tyre monitoring devices themselves. A fault in any sensor causes all sensors to indicate a fault.

In other examples, rather than transmitting a fault indication at block 810, all tyre monitoring devices may instead transmit their measured pressure to other tyre monitoring device. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 806. Such examples may provide assurance that all sensors are operating correctly, since no data received is indicative of a malfunction or fault in the tyre monitoring device.

Figure 9:
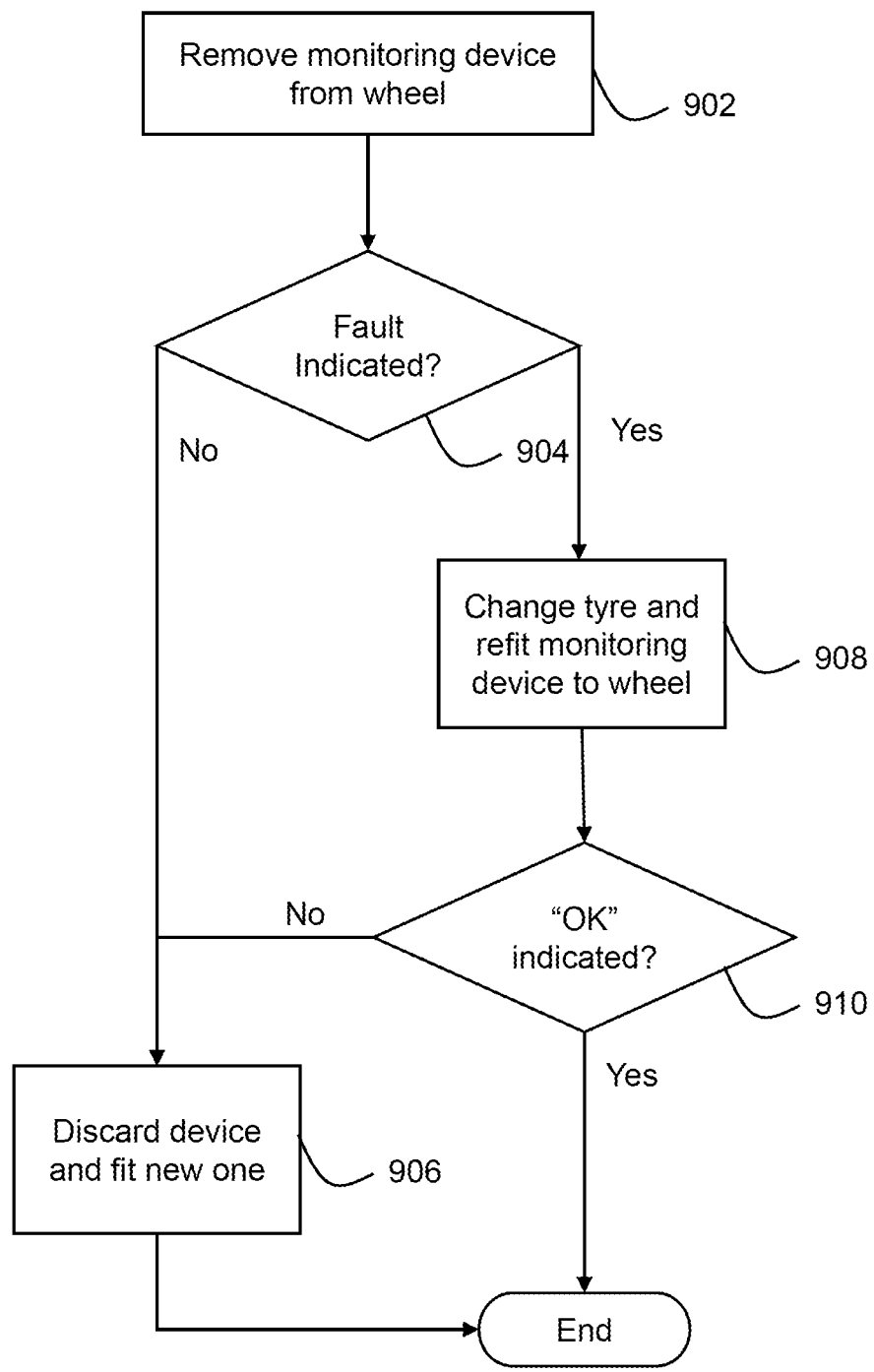
FIG. 9 shows a flow chart of a tyre change process that can be used with the example of FIG. 1.

FIG. 9 shows a flow chart of a tyre change process that can be used with the example of FIG. 1. It is necessary to change the tyres periodically on a vehicle, this may occur within the lifetime of a tyre monitoring device. To reuse an existing tyre monitoring device the following procedure can be used.

First, at block 902, the tyre monitoring device is removed. It will then be reading zero pressure so the indicator will be controlled by the processor to indicate a fault. At step 904, the fault indication is checked. If no fault is indicated, the tyre monitoring device is faulty and should be replaced. At block 906 a new tyre monitoring device is installed, for example following the process of FIG. 10.

If a fault is indicated, at block 908 the tyre is changed and the tyre monitoring device refitted. Then, at block 910 the indicator is checked for an "OK" indication. If there is an "OK" indication the process ends. If there is not an "OK" indication then the tyre monitoring device is faulty, it is discarded at block 906 and a new one fitter.

In some examples the operation of the refitted tyre monitoring device may be further confirmed, for example by checking measured tyre pressure against a manual measurement.

With the process of FIG. 9, the tyre change also serves to verify that the tyre monitoring device is working correctly.

In some examples, the "OK" indication in block 910 can also include a battery life check to ensure that the expected battery life of the tyre monitoring device is expected to be long enough for the device to last until the next estimated tyre change. For example, the processor may associate an approximately zero measured pressure (when the device is removed from the wheel) with tyre change and perform a battery check when a non-zero pressure is again measured by the pressure sensor.

Figure 10:
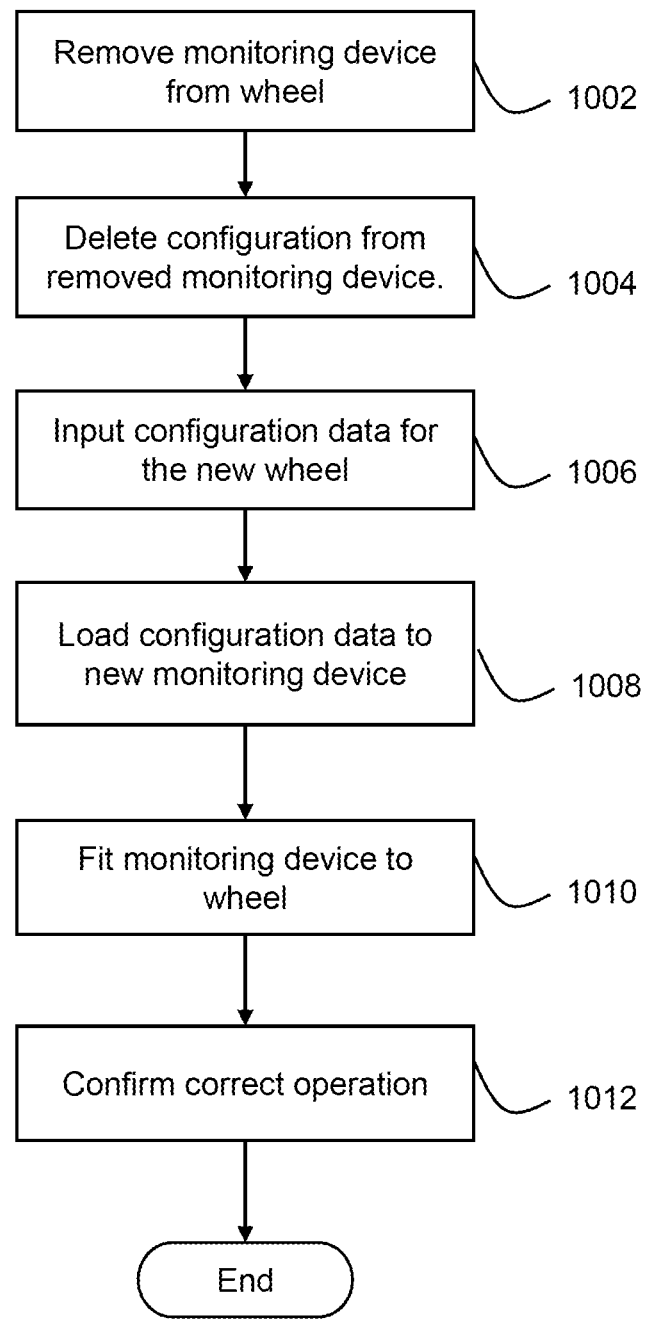
FIG. 10 shows a flow chart of a tyre monitoring device change process that can be used with the example of FIG. 1.

FIG. 10 shows a flow chart of a tyre monitoring device change process that can be used with the example of FIG. 1. This process is used to change a tyre monitoring device to a new one, for example because of a fault.

At block 1002, the tyre monitoring device is removed from the wheel. Then at block 1004, the configuration data is deleted from the removed device to ensure that it cannot be accidentally reinstalled. For example, block 1004 may comprise using the configuration device 14 to erase the data by sending a configuration command to the tyre monitoring device to erase its data.

Next, configuration data for the new tyre monitoring device is entered into the control device at block 1006. The configuration data is then loaded to a new sensing device at block 1008, for example by following the process of blocks 606 and 608 above. At block 1010 the new tyre monitoring device is attached to the wheel. The correct operation of the system may then be confirmed at block 1012.

In some examples, configuration of a new tyre monitoring device may be cloned from the removed device and copied to the new device automatically. For example, block 1004 may comprise reading and storing the configuration data before erasing and this is then used to configure the new device at block 1008. Block 1006 may then be omitted or instead display the configuration data for a user to confirm it is correct before loading to the new device.

Although the processes above describe the use of a short range communication for some of the configuration commands, other examples may use long range communication for these commands and distinguish themselves by, for example, using a different encryption protocol.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

In all the processes described above, additional security can be obtained by only enabling a tyre monitoring device to enter a configuration mode and/or accept configuration commands when a sensed pressure is approximately zero, such as less than 35 kPa (less than 5 psi). This ensures that tyre monitoring devices cannot be reconfigured when installed on a wheel with an inflated tyre. Additional security may also be provided by automatically exiting a configuration mode when the sensed pressure is no longer approximately zero. Further security may also be provided additionally or alternatively by one or more of: setting a limit on the amount of time that a tyre monitoring device can be in a configuration mode; and automatically exiting the configuration mode when configuration is complete, such as following completion of a configuration command.

It is to be noted that the term "or" as used herein is to be interpreted to mean "and/or", unless expressly stated otherwise.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A tire monitoring device configured to be mounted on a wheel and comprising:
   a pressure sensor for sensing an inflation pressure of a tire on the wheel;
   a wireless communication interface configured to receive data indicative of a command to indicate tire pressure, wherein the wireless communication interface is configured to communicate with at least one other tire monitoring device;
   a storage storing a predetermined pressure value;
   an indicator configured to provide a first indication and a second indication, wherein the first indication is different from the second indication; and
   a processing system configured to operate the indicator to provide the first indication or the second indication responsive to receipt of the command to indicate tire pressure, and based at least in part on the inflation pressure and the predetermined pressure value.

2. The tire monitoring device according to claim 1, wherein the processing system is configured to operate the indicator to provide the first indication or the second indication further based at least in part on data indicative of inflation pressure from the at least one other tire monitoring device over the wireless communication interface.

3. The tire monitoring device according to claim 1, wherein the wireless communication interface is configured to communicate with:
   the at least one other tire monitoring device over a first network; and
   a control device over a second network;
   wherein the first network and second network are separate.

4. The tire monitoring device according to claim 1, wherein the wireless communication system comprises a first transceiver and a second transceiver, the first transceiver having a longer transmission range that the second transceiver.

5. The tire monitoring device according to claim 4, wherein the second transceiver is configured for communication with a configuration device.

6. The tire monitoring device according to claim 1, wherein the indicator comprises a visual indicator.

7. The tire monitoring device according to claim 1, wherein the indicator comprises an audible indicator.

8. The tire monitoring device according to claim 1, comprising a temperature sensor for sensing a temperature of the wheel or a temperature of gas inside the tire.

9. The tire monitoring device according to claim 1, configured for use on an aircraft tire.

10. The tire monitoring device according to claim 1, wherein:
the wireless communication system is further configured to receive data indicative of a first configuration message; and
the processing system is configured to determine that the pressure measured by the pressure sensor is approximately zero; and enter a configuration mode responsive to the configuration message and the determination that the pressure is zero.

11. A tire pressure measurement system comprising a plurality of tire monitoring devices in communication with each other, wherein each tire pressure monitoring device comprises:
a pressure sensor for sensing an inflation pressure of a tire on a wheel;
a wireless communication interface configured to receive data indicative of a command to indicate tire pressure, wherein the wireless communication interface is configured to communicate with at least one other tire monitoring device;
a storage storing a predetermined pressure value;
an indicator configured to provide a first indication and a second indication, wherein the first indication is different from the second indication; and
a processing system configured to operate the indicator to provide the first indication or the second indication responsive to receipt of the command to indicate tire pressure, and based at least in part on the inflation pressure and the predetermined pressure value.

12. The tire pressure measurement system according to claim 11, comprising:
a control device comprising a wireless communication interface configured to transmit data indicative of a command to at least one of the plurality of tire monitoring devices.

13. The tire pressure measurement system according to claim 11, comprising:
a configuration device comprising a wireless communication interface configured to transmit data indicative of a configuration command to at least one of the plurality of tire monitoring devices.

14. The tire pressure measurement system according to claim 13, wherein the wireless communication interface of the configuration device has a transmit range of less than 1 m.

15. A tire monitoring device comprising a pressure sensor, a storage and a wireless communication interface, wherein the tire monitoring device is configured to:
receive, via the wireless communication interface, data indicative of a first configuration message from a first device;
determine that the pressure measured by the pressure sensor is approximately zero; and
enter a configuration mode responsive to the configuration message and the determination that the pressure is zero.

16. The tire monitoring device according to claim 15, wherein the tire monitoring device is further configured to receive data indicative of a second configuration message from a second device while in the configuration mode; and set a configuration parameter in the storage based on the second configuration message.

17. The tire monitoring device according to claim 15, wherein the data indicative of a first configuration message is received using a first wireless communication mode and the data indicative of a second configuration message is received using a second wireless communication mode.

\* \* \* \* \*